Patented Oct. 3, 1933

1,928,988

UNITED STATES PATENT OFFICE 1,928,988

METHOD OF TREATING RUBBER SURFACES AND PRODUCT PRODUCED THEREBY

Parke H. Watkins, Naugatuck, Conn., assignor to The Naugatuck Chemical Company, Naugatuck, Conn., a corporation of Connecticut No Drawing. Application December 3, 1931
Serial No. 578,737

20 Claims. (Cl. 18—53)

This invention relates to methods for producing a non-tacky feel or exterior on the surfaces of rubber articles and the products produced thereby.

In the preparation of rubber articles by various well known dipping methods, the surface of the finished article even after vulcanization retains to a great extent an undesirable tacky surface and frictional feel. Various methods have been resorted to in order to reduce the friction and adhesiveness of rubber surfaces, such as dusting the surfaces with starch, talc, mica, whiting, zinc stearate, and other materials. These expediencies are only of temporary value. For example in the treatment of surgeons' gloves such materials would be scrubbed off after the first sterilization and in addition would be classed as "foreign" materials capable of holding bacteria. Rubber articles, and especially dipped goods, are frequently cured at elevated temperatures in water containing a water soluble accelerator. While this method has a tendency to slightly overcure the surface and thus produce some degree of hardness and freedom from tack, the surface still remains too tacky to be considered entirely satisfactory. Rubber surgeons' gloves prepared by dipping a form in an aqueous dispersion of rubber and coagulating the deposit, are sometimes cured by this method but they are still considered too tacky for commercial use. Frequently rubber articles are completely cured in an atmosphere of sulphur chloride followed in turn by treatment with ammonia vapor to neutralize free acidity. Such a method produces a hardened surface but the articles do not age satisfactorily, and ordinarily such a method is restricted to the curing of very thin films. In place of sulphur chloride vapor cure, rubber articles are sometimes cured by dipping in a benzene or naphtha solution of sulphur chloride followed by an ammonia treatment. Such articles also do not age satisfactorily and in addition the articles swell non-uniformly under the influence of the solvent and become distorted without resuming their former shapes after drying. It has been proposed also to treat rubber surfaces with free helagone vapors as well as solutions of free halogens in an organic solvent such as carbon tetrachloride. The treatment with a free halide vapor is an extremely harsh treatment on a rubber surface and tends to impart poor ageing qualities to the article. The treatment with a halide in an organic solvent tends to swell the rubber articles non-uniformly and distort them until such articles no longer resume former shapes after drying. In addition this latter treatment tends at times to discolor the surface non-uniformly and produce undesirable streaks.

This invention relates to methods for removing surface tack of rubber articles and providing an exterior surface non-tacky to touch thereon. By the method of the present invention the water repellent qualities of rubber articles are increased, as is also the tensile strength and resistance to ageing. Rubber articles, in which the surface has been rendered non-tacky by the method of the present invention, are also more resistant to the softening and swelling action of oils and solvents.

The treatment of the present invention is applicable to a wide variety of rubber articles. For example, surgeons' gloves at present show a marked tendency to adhere to each other, or portions of the gloves to stick together, following sterilization as practiced in modern hospitals. In overcoming this troublesome condition, it often happens that the rubber surfaces are ruptured or torn. Also, the unusual pressure required to separate such adhering surfaces may tend to increase the danger and hazards of contamination. The non-tacky and slightly hardened surface following the treatment of the present invention precludes and eliminates such difficulties. Furthermore, the marked increase in moisture repellent qualities of the treated surfaces constitutes an added safeguard to modern surgery. It is well known that the pathogenic micro-organisms are present in the aqueous phase of serum, plasma, mucous, pus, etc. in surgical cases. Unfortunately, many of these bacteria are able to resist a single sterilization by changing into the "spore" form during this treatment and becoming activated later under a cool, moist condition. The entrance of moisture in the rubber film during the surgical operation affords a direct pathway for such bacteria to remain inactive as "spores", following and subsequent to sterilization, during storage, and to become reactivated during the next surgical operation. The present invention is applicable to the treatment of all types of gloves and irrespective of how the cure has been effected, whether in air, water, steam, mixtures of the same, or by other means, all of which show an undesirable adhesive tendency, and irrespective of whether such gloves are made from latex rubber or rubber cements, both processes well known in glove manufacture today. It is frequently desirable to use this invention on the uncured rubber surfaces of such articles prior to cure with unusual advantages and improvement resulting therefrom.

Similarly the process of the invention may be applied to the inside surfaces of gloves, rubber shoes, bathing shoes, or other articles, and there is so marked a decrease in friction that in some instances, such as footholds, the usual fabric or other inner lining may be entirely eliminated.

The treatment, according to the present invention, may also be applied to harden the surface of rubber covered rolls, plating racks, exhauster runners, rubber lined tanks, garbage containers, tumbling barrels, pipe, etc., and the treatment prevents foreign material, such as dust, dirt, grease, etc. from adhering to the surface and facilitates the removal of the same. In addition, the non-tacky character of these treated surfaces is of especial value in products which are subjected to high pressure while wet and allowed to dry out in position. In this respect wringer rolls and rubber tubing may be cited as illustrations. For example, ordinary rubber tubing, when compressed by clamps or used in the construction of valves, remains collapsed or tends to stick when dry. Rubber bearings, in which the bearing surfaces have been treated, have a less degree of drag or friction when wet with water or a liquid not harmful to rubber.

In general, the improvements described above apply to all rubber products in which the surface has been treated according to the disclosures of the present invention, whether they be made by dipping, electro-depositing, spreading, calendering, molding, extruding, or other methods known in the art. Further, the rubber articles may be made from ordinary sheet rubber as received from the plantations, from solvent rubber cement, or from aqueous dispersions of rubber such as natural latex or artificial rubber dispersions.

In carrying out the invention the rubber article is submitted to a surface treatment with an aqueous solution of an oxidizing agent for a relatively short period of time, and, if desired, treated with dilute alkali and dried. As specific illustrations of various ways of carrying out the invention but without intention to limit the invention except as required by the prior art, the following examples are included:

A rubber article may be subjected to water saturated with a halogen, for example, chlorine, bromine or iodine, and afterwards rinsed in 3% solution of ammonium hydroxide. Specifically in the case of cured surgeons' gloves, 10 minutes in chlorine water or 15 minutes in bromine water produces the desired effect on the surface. With iodine, in order to obtain higher solubility in water, the water is first saturated with potassium iodide and then the iodine added. With iodine solution as prepared above, the time of treatment was 30 minutes and the surface film of the gloves assumed a slightly yellow color.

Rubber articles may be subjected to the action of a neutral saturated solution of potassium dichromate in water for a period of 60 minutes and then rinsed a few minutes in a 3% solution of ammonium hydroxide to secure the desired effects. A noticeable reduction in the time of treatment may be effected by treating the rubber surface with an aqueous solution of chromic acid or potassium dichromate and sulphuric acid.

Rubber articles may also be subjected to a 2% solution of bleaching powder (principally calcium hypochlorite) in water for a period of 20–30 minutes at room temperature to secure the desired surface effects. Rinsing for a few minutes in 3% ammonium hydroxide is desirable in order to obtain good aging properties.

A saturated neutral solution of potassium permanganate in water will give the desired result on a vulcanized rubber surface in 30 minutes, but the color of the surface turns deep brown due to the deposition of manganese dioxide. Again the reaction time may noticeably be decreased in the presence of acid or alkaline permanganate.

A most excellent method of treatment of a rubber surface may be accomplished by subjecting the surface to a treatment with a dilute solution of alkaline hypochlorite for a relatively short period of time. For example, a treatment with a 2% solution of sodium hypochlorite in water at room temperature for a period of approximately 10-15 minutes, or a treatment with a 10% solution of sodium hypochlorite for a period of approximately 45 to 60 seconds, followed by rinsing for a few minutes in a dilute alkali, such as 3% aqueous ammonium hydroxide, will produce the desired result.

The present invention is especially adapted for treatment of cured surfaces. It has also been found entirely practical to apply the invention to uncured rubber surfaces, and, following such treatment, to note a reduction in tack on the rubber articles in the uncured condition with a further reduction in tack after vulcanization. As an example, in the manufacture of shoe stocks and the like, which are not to be given a superficial varnish finish, there frequently arises cases where the assembled articles come in contact with one another during ordinary handling incidental to placing in the vulcanizer. The normal tack present in the uncured article is frequently sufficient to cause adhesion or sticking between the common or touching surfaces thereof and to result in inferior products known as "seconds" during the vulcanization step. The treatment of such uncured stocks, according to the present invention, reduces the normal surface tack and thus minimizes the hazards incidental to ordinary handling prior to and during the vulcanization process.

Another example wherein the present invention may be applied to uncured surfaces is in the case of rubber shoes, etc., in which the fabric lining has been omitted. Prior to this invention, sulphur chloride in solvent solution was tried for the purpose of reducing the surface tack and frictional resistance sufficiently to allow the elimination of fabric lining in the manufacture of rubber shoes. The treatment was unsuccessful and the cause for failure was due to too great hardening and stiffening and absence of all tack on the cured surface which prevented the article from being assembled in the usual manner. It may readily be seen that one function of the fabric lining in the manufacture of rubber shoes has been to facilitate assembling of the finished article, since one surface of the fabric lining is ordinarily frictioned with a coating of an adhesive rubber compound. Where shoe stocks and the like are treated according to the present invention prior to vulcanization, the reduction in tack on the uncured surface may be controlled to the proper degree to allow assembling of the article in the usual manner. The assembled article may subsequently be vulcanized and such operation will complete the removal of surface tack. In the case of shoe "uppers" where the fabric lining is to be omitted, the uppers may be treated either prior to or subsequent to cutting out the sections in the desired shapes, by immersing in a 2% solution of sodium hypochlorite at room temperature for from 10 to 15 minutes. If only one side is to be treated, the rubber surface to be treated may be passed over rolls running in a 10 to 30% solution of sodium hypochlorite. Again, if only one side is to be treated, a dilute solution of sodium hypochlorite may be flowed over the surface in any desired manner and allowed to remain in contact with the surface for the desired length of time, depending on the degree of tack desired during the assembling of the finished article, and before and after vulcanization. The surface of the material thus treated may be washed with water, followed by a rinsing for a few minutes in dilute alkali, such as a 3% aqueous ammonium hydroxide, and dried.

Various oxidizing agents may be used, but the examples described above are the present preferred examples of the invention. The desired result with various other oxidizing agents, however, is sometimes not obtained for so long a period of time as to make such treatment of little commercial importance. For example, by way of illustration, it is found in the case of 32% hydrogen peroxide in water solution that a cured rubber surface only just reaches the non-tacky stage at the end of 20 hrs.

The present invention is applicable to rubber surfaces generally, whether made from crude rubber, or dispersions or so-called solutions of rubber. Rubber products which are made from aqueous dispersions of rubber such as latex or artificial dispersions show this improvement whether the rubber film has been electrodeposited, or deposited by an alternating dipping and drying or dipping and chemical coagulating process. The present invention is applicable to such deposition products whether prepared from so-called vulcanized latex or unvulcanized latex, whether or not such is vulcanized after deposition by the usual curing methods or cured in water containing an accelerator. The invention has been used successfully on rubber which has been adhered to cement, wood, fabric, metal, etc. either by pressure or through the use of special adhesives, and by the term "rubber article" as used in the specification and claims, it is desired to include all such composite articles composed in part of rubber as well as articles composed entirely of rubber or rubber-like materials. The term "surface" in the specification and claims is to be interpreted to mean any desired part of the surface or surfaces of the rubber article as well as the whole, since it is clear only the desired parts of the article need be treated by the method of the invention. Rubber films made from rubber cement and cured in the usual manner or in vapors or solvent solutions of sulphur chloride or in water containing accelerator all show the desired effects under the present invention. In general the invention is applicable to rubber surfaces irrespective of whether such surfaces are applied by dipping, spreading, molding, calendering, extruding, or other methods.

While the invention has been described more or less in detail, it is not intended thereby to so limit the invention inasmuch as the examples herein set forth are merely illustrative and various modifications may be made without departing from the invention, the scope of which is indicated in the following claims.

Having thus described my invention, what I claim and desire to protect by Letters Patent is:

1. The method of treating a rubber article formed from a deposit of solids of an aqueous dispersion of rubber to produce a non-tacky surface thereon comprising vulcanizing the article, treating the surface with an aqueous solution of an oxidizing agent, and drying.

2. The method of producing a non-tacky surface on rubber comprising vulcanizing the rubber surface treating the surface with an aqueous solution of an oxidizing agent from the group consisting of halogens, dichromates, chromic acid, hypochlorites, and permanganates, and drying.

3. The method of treating rubber article formed from a deposit of solids of an aqueous dispersion of rubber to produce a non-tacky surface thereon comprising vulcanizing the article, treating the surface with an aqueous solution of sodium hypochlorite, and drying.

4. The method of producing a non-tacky surface on rubber comprising vulcanizing the rubber surface treating the surface with an aqueous solution of sodium hypochlorite, treating the surface with an alkali, and drying.

5. The method of producing a non-tacky surface on a rubber article formed from a deposit of solids of an aqueous dispersion of rubber comprising treating the surface with an aqueous solution of an oxidizing agent, and drying.

6. The method of treating a rubber article formed from a deposit of solids of an aqueous dispersion of rubber to produce a non-tacky surface thereon comprising treating the surface with an aqueous solution of an oxidizing agent from the group consisting of halogens, dichromates, chromic acid, hypochlorites, and permanganates, and drying.

7. The method of producing a non-tacky surface on a rubber article formed from a deposit of solids of an aqueous dispersion of rubber comprising treating the surface with an aqueous solution of sodium hypochlorite, and drying.

8. The method of producing a non-tacky surface on a rubber article formed from a deposit of solids of an aqueous dispersion of rubber comprising treating the surface with an aqueous solution of sodium hypochlorite, treating the surface with an alkali, and drying.

9. The method of treating rubber to provide a non-tacky surface thereon comprising vulcanizing the rubber surface, treating the surface with an aqueous solution of an oxidizing agent, and drying.

10. The method of treating rubber to provide a non-tacky surface thereon comprising vulcanizing the rubber surface, treating the surface with an aqueous solution of sodium hypochlorite, and drying.

11. The method of making a rubber article having a non-tacky surface comprising forming the article in the shape desired in an uncured condition, treating the surface of said article with an aqueous solution of an oxidizing agent to reduce the surface tack, and subsequently vulcanizing the article.

12. The method of making a rubber article having a non-tacky surface comprising forming the article by deposition from an aqueous dispersion of rubber, vulcanizing the article, treating the surface of the article with an aqueous solution of an oxidizing agent from the group consisting of halogens, dichromates, chromic acid, hypochlorites, and permanganates, and drying.

13. The method of making a rubber article having a non-tacky surface comprising forming the article by deposition from an aqueous dispersion of rubber, vulcanizing the article, treating the surface of the article with an aqueous solution of sodium hypochlorite, treating the surface with an alkali, and drying.

14. A vulcanized rubber article having a non-tacky and hardened surface derived from a surface treatment with an aqueous solution of an oxidizing agent from the group consisting of halogens, dichromates, chromic acid, hypochlorites, and permanganates formed from the deposition of solids of an aqueous dispersion of rubber.

15. A vulcanized rubber article having a non-tacky and hardened surface derived from a surface treatment with an aqueous solution of an oxidizing agent.

16. A vulcanized rubber article having a non-tacky and hardened surface derived from a surface treatment with an aqueous solution of an oxidizing agent from the group consisting of halogens, dichromates, chromic acid, hypochlorites, and permanganates.

17. A vulcanized rubber article having a non-tacky and hardened surface derived from a surface treatment with an aqueous solution of sodium hypochlorite.

18. A rubber article formed from the deposition of solids of an aqueous dispersion of rubber having a non-tacky and hardened surface derived from a treatment with an aqueous solution of an oxidizing agent.

19. A vulcanized rubber article formed from the deposition of solids of an aqueous dispersion of rubber having a non-tacky and hardened surface derived from a treatment with an aqueous solution of an oxidizing agent.

20. A vulcanized rubber article formed from the deposition of solids of an aqueous dispersion of rubber and having at least a portion of the surface with a non-tacky and hardened surface derived from a treatment with an aqueous solution of sodium hypochlorite.

PARKE H. WATKINS.